United States Patent [19]

Nakano

[11] Patent Number: 6,030,309
[45] Date of Patent: Feb. 29, 2000

[54] TOROIDAL TYPE CONTINUOUSLY VARIABLE TRANSMISSION

[75] Inventor: Masaki Nakano, Yokohama, Japan

[73] Assignee: Nissan Motor Co., Ltd., Yokohama, Japan

[21] Appl. No.: 09/090,183

[22] Filed: Jun. 4, 1998

[30] Foreign Application Priority Data

Jun. 5, 1997 [JP] Japan .................................. 9-147354

[51] Int. Cl.[7] .................................................. F16H 15/38
[52] U.S. Cl. .................................. 476/10; 476/42; 476/46
[58] Field of Search ............................... 476/10, 40, 41, 476/42, 46

[56] References Cited

U.S. PATENT DOCUMENTS

| | | | |
|---|---|---|---|
| 4,905,529 | 3/1990 | Nakano | 74/201 |
| 5,423,727 | 6/1995 | Fellows | 476/40 |

FOREIGN PATENT DOCUMENTS

| | | | |
|---|---|---|---|
| 197 06 287 A1 | 11/1997 | Germany . | |
| 62-202564 | 12/1987 | Japan . | |
| 63-92859 | 6/1988 | Japan . | |

OTHER PUBLICATIONS

Patent Abstracts of Japan, vol. 017, No. 123 (M–1380), Mar. 15, 1993 & JP 04 307152 A (Nissan Motor), Oct. 29, 1992.

*Primary Examiner*—Allan D. Herrmann
*Attorney, Agent, or Firm*—Foley & Lardner

[57] ABSTRACT

Input and output cone discs are coaxially arranged. Power rollers are each operatively interposed between the input and output cone discs. Trunnions are rotatable supporting the power rollers respectively. An upper link has opposed ends to which upper ends of the trunnions are connected, and a lower link has opposed ends to which lower ends of the trunnions are connected. Shafts extend downward from the lower ends of the trunnions. Each shaft is connected to the corresponding lower end through a connecting pin. Pistons are associated with the shafts respectively. Each piston has a hollow boss portion which receives therein the corresponding shaft. The hollow boss portion has an upper end which faces toward the lower end of the corresponding trunnion. Articulated structures are associated with the trunnions respectively. Each articulated structure is arranged between the upper end of the hollow boss portion and the lower end of the corresponding trunnion, so that when a thrust force is applied to the trunnion in a direction to resiliently flex or bend the same, the trunnion is permitted to pivot relative to the hollow boss position in a direction to absorb the flex of the trunnion.

16 Claims, 9 Drawing Sheets

TOROIDAL TYPE CONTINUOUSLY VARIABLE TRANSMISSION

The contents of Japanese Patent Application 9-147354 filed Jun. 5, 1997 are hereby Incorporated by reference.

BACKGROUND OF THE INVENTION

1. Field of the Invention

The present invention relates in general to a toroidal type continuously variable transmission, and more particularly to a toroidal power transmission unit employed in the transmission.

2. Description of the Prior Art

In order to clarify the task of the present invention, a known toroidal type continuously variable transmission will be described with reference to FIGS. 9 to 11 of the accompanying drawings. Such transmission is shown in Japanese Utility Model Provisional Publication 63-92859.

For ease of description, the toroidal type continuously variable transmission will be referred to as toroidal type-CVT, hereinafter.

FIGS. 9 and 10 show part of the toroidal type-CVT. In FIG. 9, designated by numerals 1 and 2 are input and output cone discs which are arranged on a common rotation axis "O1", and designated by numerals 3 and 3 are power rollers which are each operatively interposed between the input and output cone discs 1 and 2. The power rollers 3 and 3 are arranged to face each other with the axis "O1" placed therebetween. The input and output cone discs 1 and 2 and the two power rollers 3 and 3 constitute one toroidal power transmission unit.

In a double cavity toroidal type-CVT, two, that is, front and rear toroidal power transmission units are employed, which are coaxially arranged on the axis "O1" with their output cone discs 2 and 2 connected in a back-to-back connecting manner.

The power rollers 3 and 3 of the front transmission unit are rotatably supported by respective trunnions 4 and 4 as is seen from FIG. 9, and the power rollers of the rear transmission unit are rotatably supported by respective trunnions 5 and 5 as will be understood from FIG. 10.

As is understood from FIG. 9, the trunnions 4 and 4 (or, 5 and 5) have respective upper ends connected through an upper link 6 and respective lower ends connected through a lower link 7. The connection of these parts is so made that each trunnion 4 (or 5) can pivot between a neutral position as shown in FIG. 9 wherein a rotation axis "O2" of the power roller 3 intersects the rotation axis "O1" of the input and output cone discs 1 and 2 and an offset position wherein the trunnion 4 (or 5) is inclined toward a pivot axis "O3" of the power roller 3 which intersects the rotation axis "O2" at right angles. The trunnion 4 (or 5) pivots about the pivot axis "O3".

For achieving the above-mentioned offset movement, each trunnion 4 (or 5) has a shaft 10 connected thereto through a connecting pin 12, the shaft 10 extending in the direction of the pivot axis "O3".

A piston 14 is connected to the shaft 10. The piston 14 is formed with a hollow boss portion 14a which receives therein the shaft 10. Due to movement of the piston 14 along an axis of the hollow boss portion 14a, the above-mentioned pivotal movement of the trunnion 4 (or 5) is induced.

As is seen from FIG. 9, the hollow boss portion 14a of the piston 14 of the front transmission unit, which is incorporated with the left trunnion 4, passes through both a cylinder body 15 which houses therein the piston 14 and a control valve body 18 which produces a hydraulic pressure for actuating the piston 14, and the hollow boss portion 14a of the piston, which is incorporated with the right trunnion 4, passes through only the cylinder body 15. While, as is seen from FIG. 10, the hollow boss portions 14a of the pistons 14 of the rear transmission unit, which are incorporated with the trunnions 5, pass through the cylinder body 15.

The control valve body 18 is equipped with a speed control valve 17. That is, upon receiving a gear ratio command, the speed control valve 17 moves the pistons 14 with a hydraulic pressure corresponding to the content of the command. With this, each piston 14 pivots through the corresponding shaft 10 the trunnion 4 (or 5) between the above-mentioned neutral position of FIG. 9 and the above-mentioned offset position. Upon this, each power roller 3 is pivoted about the pivot axis "O3" while receiving a component force from the input and output cone discs 1 and 2, so that the rotation speed of the output cone disc 2 is continuously varied relative to that of the input cone disc 1. That is, due to continuously varying contact points of the power rollers 3 to the input and output cone discs 1 and 2, the gear ratio is continuously varied between the input and output cone discs 1 and 2. In other words, a continuously variable speed change is obtained.

As is seen from FIGS. 9 and 10, the shaft 10 of one of the trunnions 4 of the front transmission unit has a lower end projected downward from the control valve body 18, to which a precess cam 9 is secured. A speed change link 21 is incorporated with the precess cam 9, through which the above-mentioned movement of the trunnion 4 is fed back to the speed control valve 17. Due to this feed back control, the trunnions 4 and 5 of the front and rear transmission units are forced to return toward their original positions, and when the existing gear ratio becomes in agreement with the target value of the command, the trunnions 4 and 5 are returned to the original positions bringing back the power rollers 3 to their neutral positions. With this, the gear ratio is kept at the target value.

However, due to inherent construction, the above-mentioned toroidal type-CVT tends to have the following drawback.

That is, under operation of the toroidal power transmission unit, each power roller 3 is hardly compressed between the input and output cone discs 1 and 2 with a force corresponding to a delivered torque therebetween because the torque delivery has to be made by shearing oil film placed between the power roller 3 and each of the input and output cone discs 1 and 2. Accordingly, as is understood from FIG. 11, under operation, each power roller 3 is applied with a marked thrust "F" in a direction to be driven out from the input and output cone discs 1 and 2. Thus, for suppressing undesired displacement of the trunnion 4 (or 5) even when such marked thrust "F" is applied thereto, the upper ends and lower ends of the paired trunnions 4 and 4 (or, 5 and 5) are connected through the respective upper and lower links 6 and 7, as is described hereinabove.

Accordingly, as is shown by phantom lines in FIG. 11, under operation of the transmission, by the marked thrust "F", the trunnion 4 (or 5) is resiliently flexed or bent slightly but in a certain degree with the upper and lower links 6 and 7 serving as fulcrums, so that the shaft 10 and the piston 14 are forced to incline, as shown. However, this inclination tends to generate a marked friction force between the hollow boss portion 14a of the piston 14 and a wall of a bore the cylinder body 15 through which the boss portion 14a passes.

Of course, to achieve smoothed and reliable operation of the toroidal-type CVT, elimination of such friction force is needed.

SUMMARY OF THE INVENTION

It is therefore an object of the present invention to provide a toroidal type-CVT which is free of the above-mentioned friction force.

According to the present invention, there is provided a toroidal type-CVT in which an inevitably occurring resilient flex or bending of the trunnion caused by the above-mentioned thrust "F" is suitably absorbed or damped by an articulated structure arranged between the trunnion and the piston, so that the flex has no effect on the piston.

According to the present invention, there is provided a friction roller type continuously variable transmission which comprises input and output discs arranged on a common axis; friction rollers each being operatively interposed between the input and output discs to transmit rotation therebetween; supporting members, each supporting member rotatably supporting the friction roller and having a shaft extending therefrom; pistons, each including a hollow boss portion in which the shaft of the corresponding supporting member is received, the hollow boss portion having a first end engageable with a second end of the corresponding supporting member, so that when the piston is axially moved, the corresponding friction roller pivots to continuously change a speed ratio between the input and output discs; links each connecting corresponding ends of the supporting members to suppress displacement of the friction roller which would occur when the friction roller is applied with a certain thrust from the input and output discs; and articulated structures associated with the supporting members respectively, each articulated structure being arranged between the first and second ends to permit a pivotal movement of the supporting member relative to the corresponding hollow boss portion when the friction roller is applied with the certain thrust.

DETAILED DESCRIPTION OF THE EMBODIMENTS

Referring to FIGS. 1 to 4 of the drawings, there is shown a toroidal type-CVT 100A which is a first embodiment of the present invention.

The transmission 100A of this embodiment is of the double cavity type which comprises front and rear toroidal power transmission units which are coaxially arranged in a transmission case. For ease of description, these two power transmission units will be referred to as front and rear transmission units respectively hereinafter.

Figure 9:
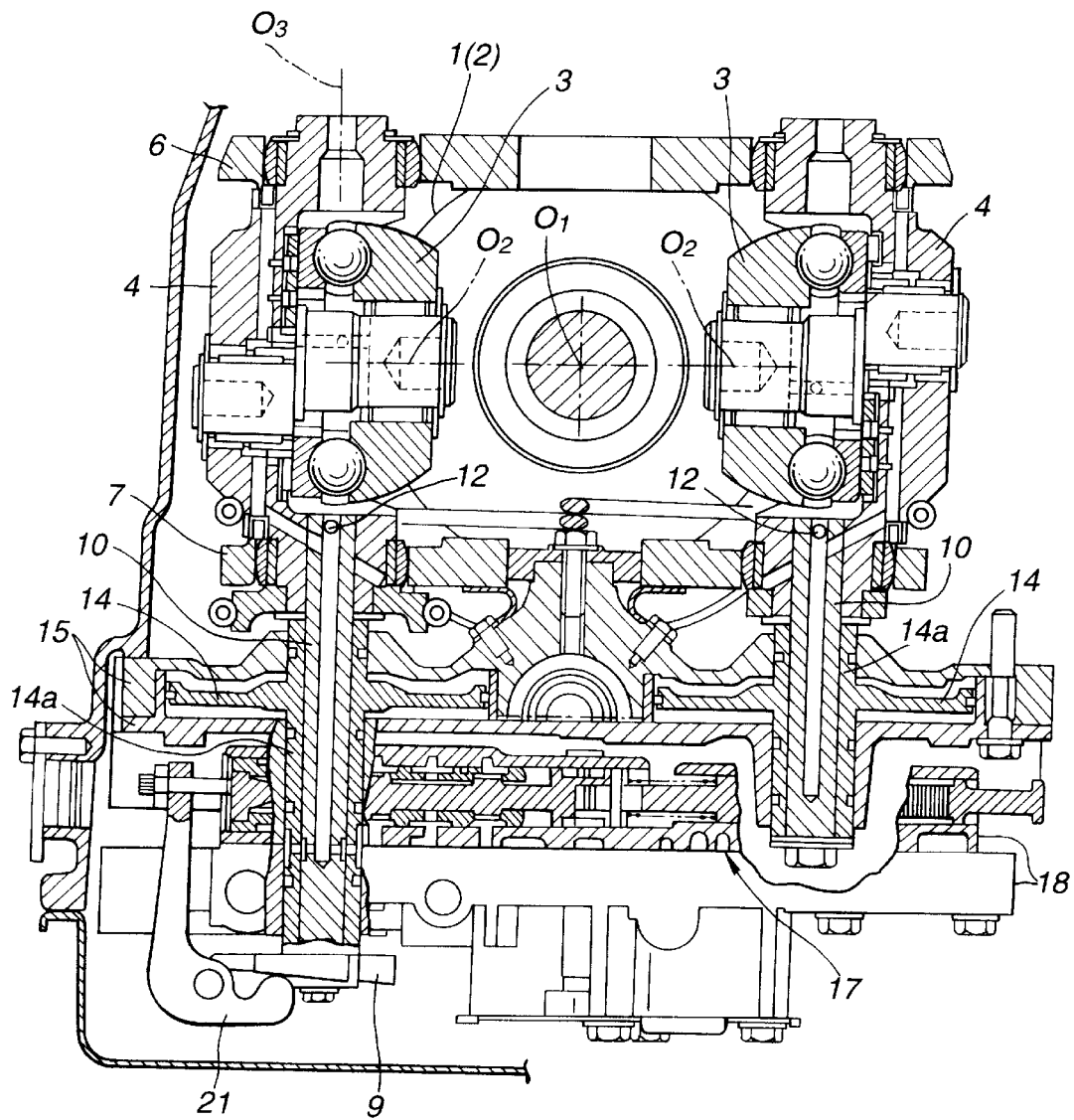
FIG. 9 is a sectional view of a conventional toroidal type-CVT.
Figure 10:
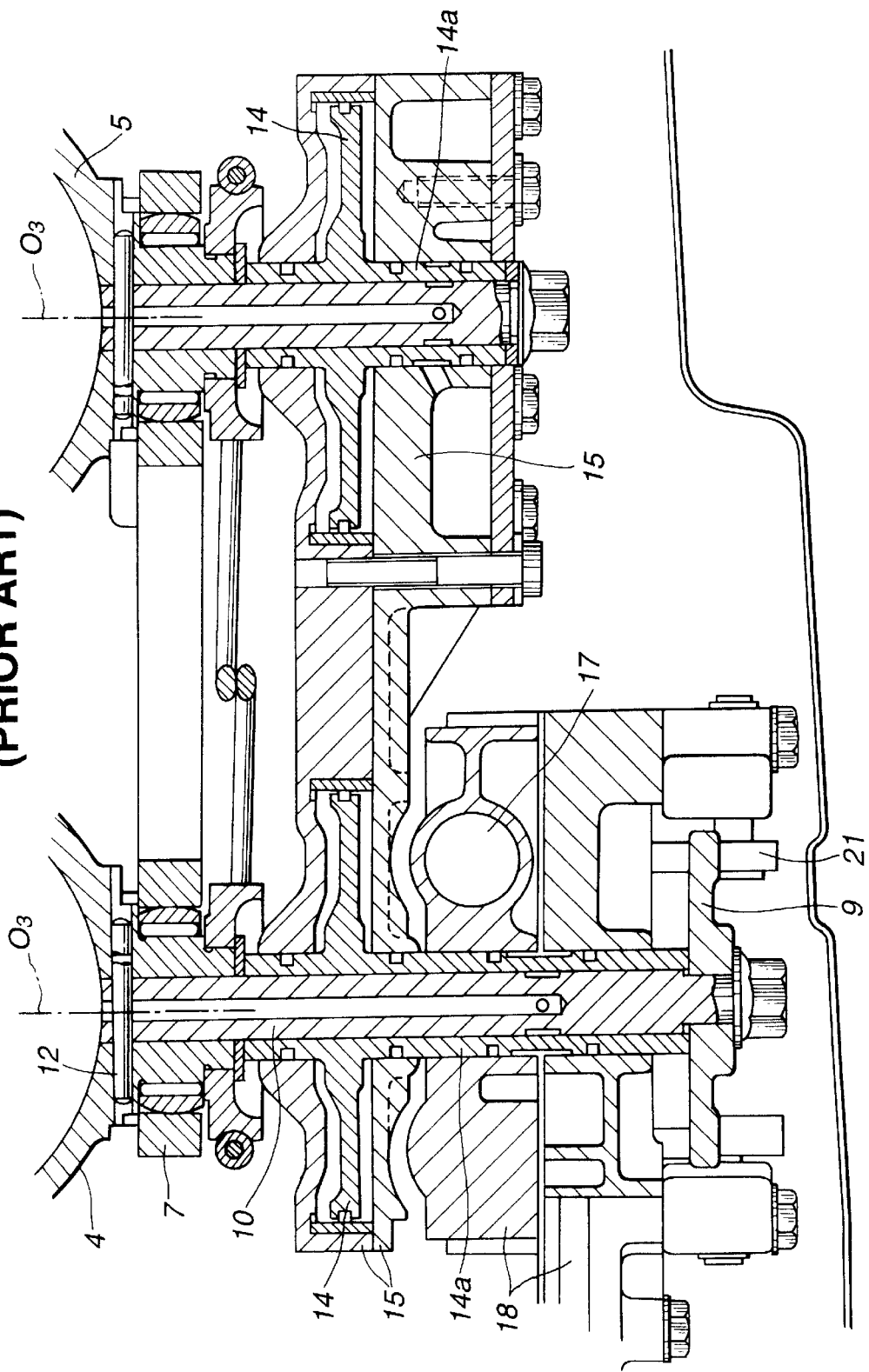
FIG. 10 is a sectional view of a trunnion actuator part of the conventional toroidal type-CVT.
Figure 11:
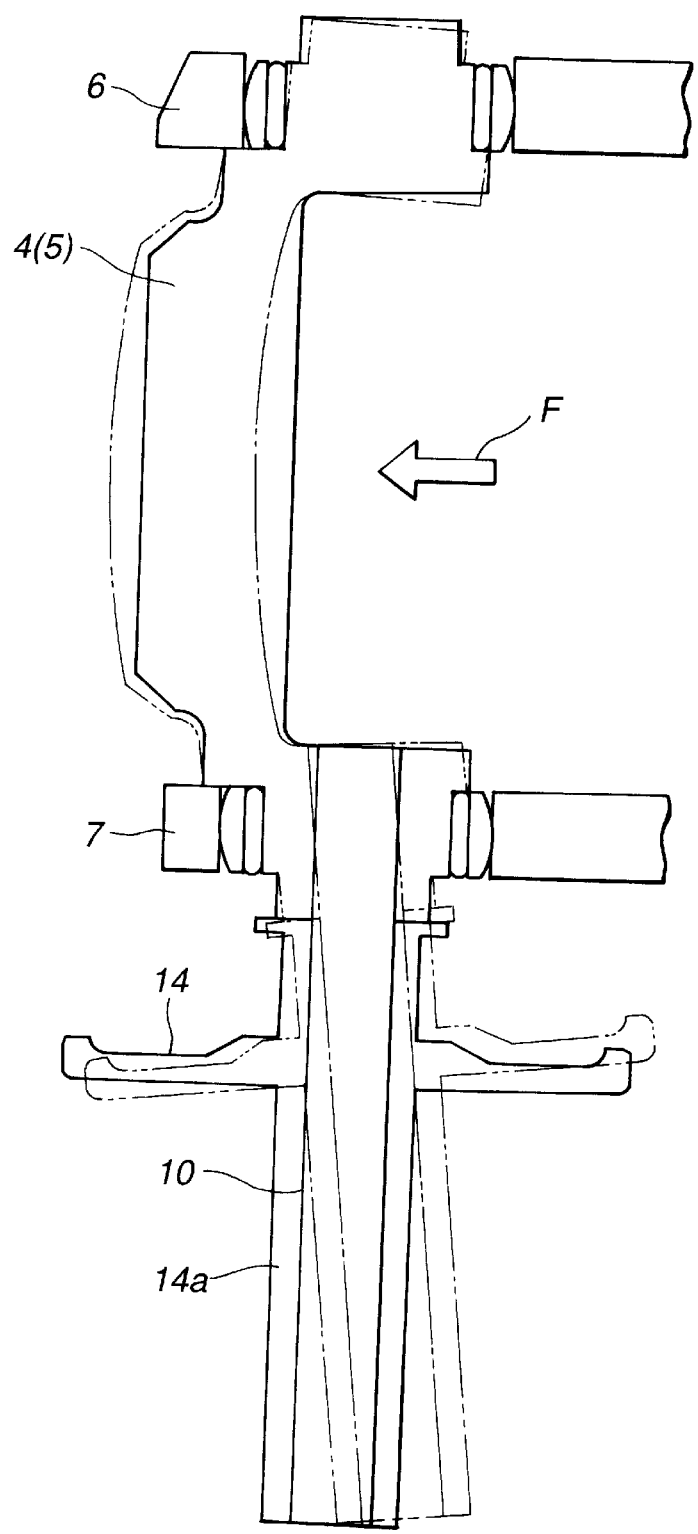
FIG. 11 is an illustration for explaining a drawback possessed by the conventional toroidal type-CVT.

In FIGS. 1 to 4, parts and portions which are substantially the same as those of the conventional transmission of FIGS. 9 and are denoted by the same numerals.

As has been described in the section of the conventional s toroidal type-CVT, the front transmission unit (viz., front toroidal power transmission unit) comprises two trunnions 4 which rotatably hold respective power rollers which are each put between input and output cone discs.

Figure 4:
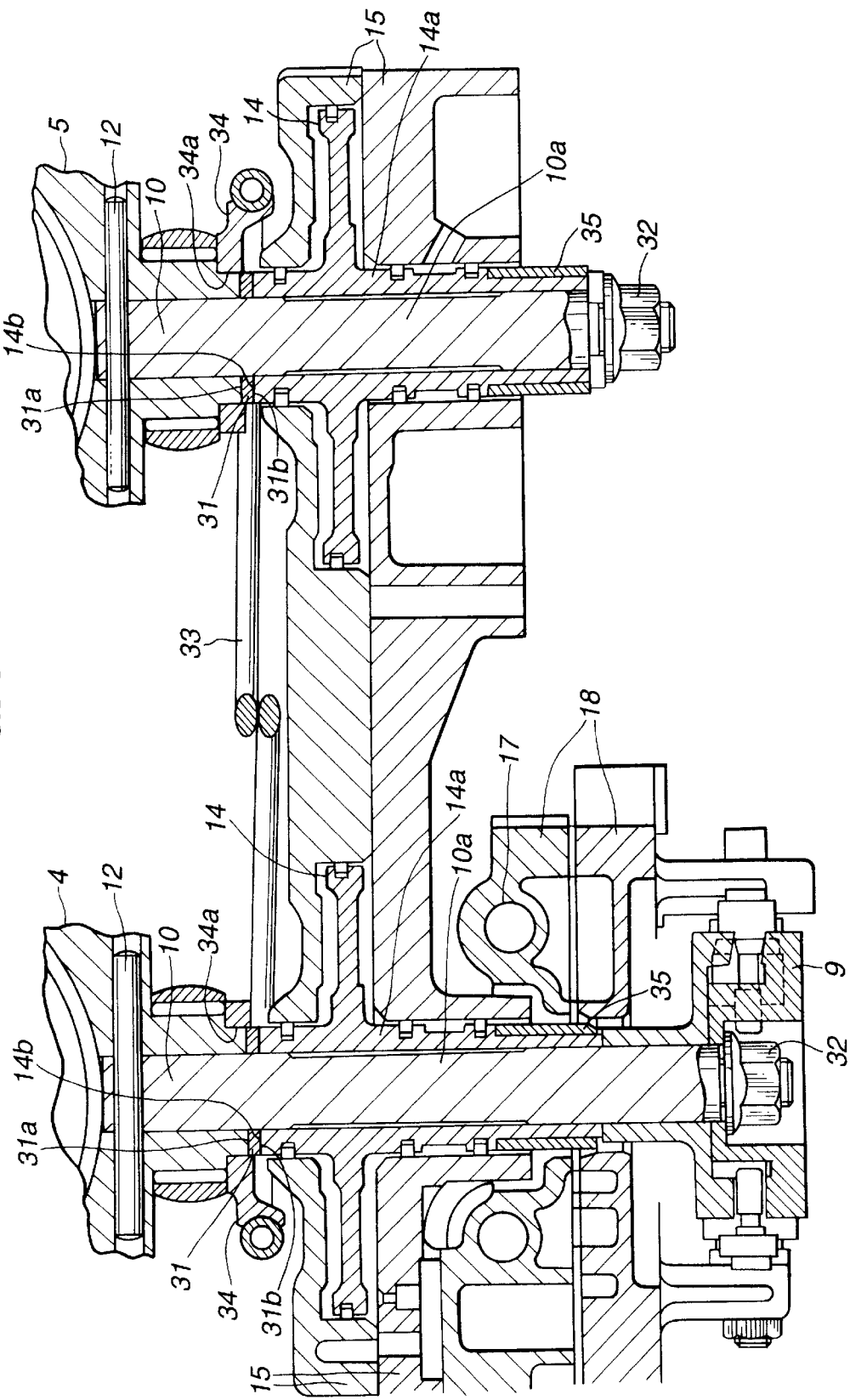
FIG. 4 is a sectional view of the trunnion actuator part of FIG. 1, but taken from a different direction.

For ease of understanding, explanation will be commenced on one of the trunnions 4 of the front transmission unit, which has a shaft 10 passing through both a cylinder body 15 and a control valve body 18 as is seen in FIG. 4.

As is seen from FIG. 4, the trunnion 4 has a lower end from which the shaft 10 (illustrated in a left side of the drawing) extends downward. That is, the shaft 10 has an upper end connected through a connecting pin 12 to the lower end of the trunnion 4. The shaft 10 passes through a washer 31, a hollow boss portion 14a of a piston 14 and a precess cam 9. A threaded lower end of the shaft 10 has a nut 32 engaged thereto for holding the parts 31, 14a and 9 in position. Due to a certain thrust produced by the nut 32, the washer 31 is tightly pressed against the lower end surface of the trunnion 4.

The lower end of the trunnion 4 has a wire pulley 34 immovably connected thereto. The wire pulley 34 puts thereon a looped wire 33 which extends to another wire pulley (34) which is incorporated with a trunnion 5 employed in the rear transmission unit (viz., rear toroidal power transmission unit). That is, due to usage of the two wire pulleys 34 and the looped wire 33 extending, synchronous movement is achieved between the power rollers in the front transmission unit and those in the rear transmission unit.

Figure 1:
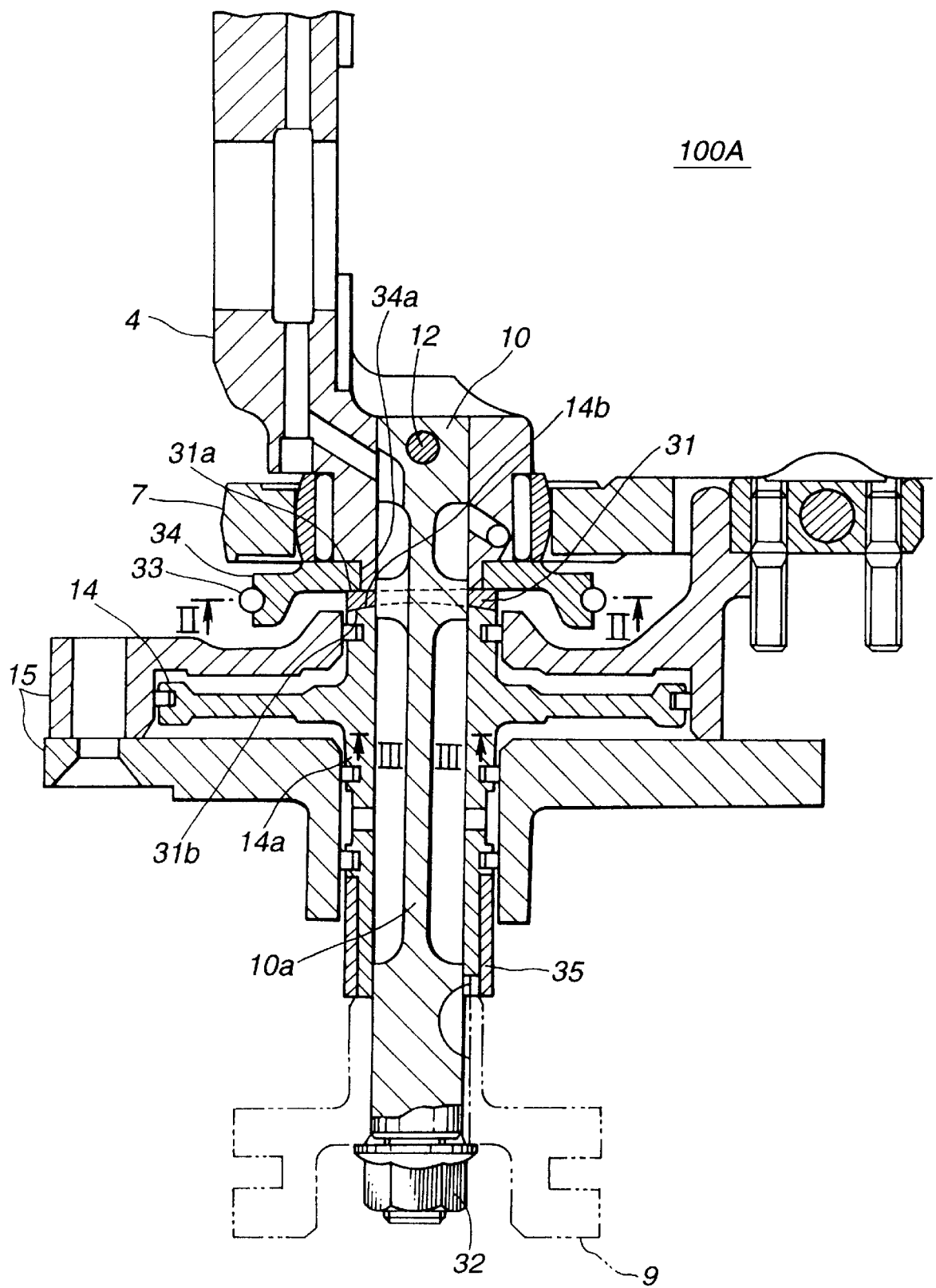
FIG. 1 is a sectional view of a trunnion actuator part of a toroidal type-CVT which is a first embodiment of the present invention.
Figure 2:
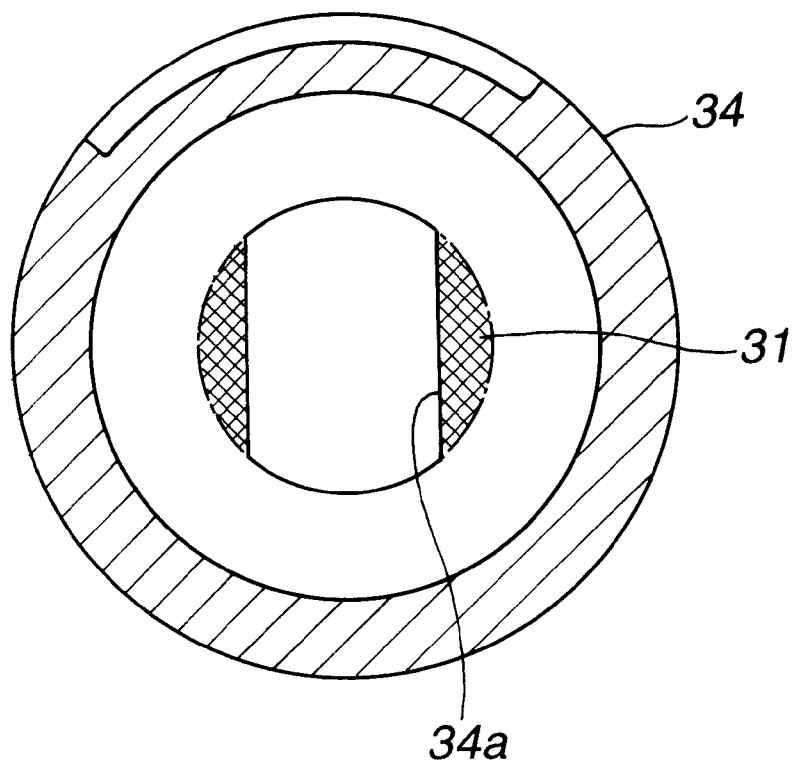
FIG. 2 is a sectional view of a wire pulley, which is taken along the line II—II of FIG. 1.

As is seen from FIG. 2, the wire pulley 34 has a non-circular center opening 34a with which the lower end of the trunnion 4 is snugly engaged, so that the wire pulley 34 is suppressed from rotation relative to the trunnion 4. Due to usage of the washer 31, the wire pulley 34 is held in position. As is shown in FIG. 1, an upper face 31a of the washer 31, which is shown by the area illustrated dashed line, has a larger area for evenly contacting the wire pulley 34.

As is seen from FIG. 1, a lower surface 31b of the washer 31 is shaped concave and an upper end 14b of the hollow boss portion 14a of the piston 14, which contacts the concave lower surface 31b of the washer 31, is shaped convex. More specifically, the concave lower surface 31b of the washer 31 and the convex surface of the upper end 14b of the hollow boss portion 14a are each shaped to constitute part of an imaginary cylindrical wall whose center axis (not shown) extends parallel with an axis of the connecting pin 12, that is, in a direction perpendicular to the surface 31b of FIG. 1.

If desired, a radius of curvature of the convex upper end 14b may be smaller than that of the concave lower surface 31b. In this case, undesired "gall" phenomenon between the two contacting portions 14b and 31b is assuredly eliminated.

Furthermore, if desired, the lower surface 31b of the washer 31 and the upper end surface 14b of the hollow boss portion 14a may be shaped convex and concave respectively, The concave lower surface 31b and the convex upper end 14b, which mutually contact to each other, thus constitute a so-called "articulated structures" which can suitably absorb undesired resilient flex or bending of the trunnion 4 which would occur when the power roller is applied with a marked outward thrust by the associated input and output cone discs 1 and 2. That is, upon producing such marked outward thrust, the articulated structure permits the trunnion 4 to pivot in a direction to absorb the thrust.

Figure 3:
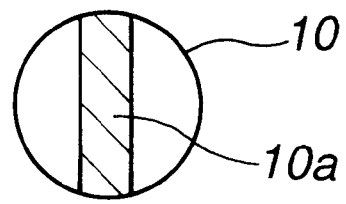
FIG. 3 is a sectional view of a trunnion shaft, which is taken along the line III—III of FIG. 1.

As is best seen from FIGS. 1 and 3, the shaft 10 has a thinner middle portion 10a which is placed in the hollow boss portion 14a of the piston 14. The thinner middle portion 10a is so constructed and oriented as to be resiliently flexed when applied with the above-mentioned thrust. In other words, the thickness of the thinner middle portion 10a measured in a direction perpendicular to the axis of the connecting pin 12 is the smallest and the thickness of the thinner middle portion 10a measured in a direction parallel with the axis of the connecting pin 12 is the largest. With presence of such thinner middle portion 10a, there are defined two elongate spaces (no numerals) in the hollow boss portion 14a, each being bounded by the thinner middle portion 10a and an inner cylindrical wall of the hollow boss portion 14a, as is seen from FIG. 3.

As is described hereinabove, the shaft 10 has the thinner middle portion 10a between the upper end connected to the trunnion 4 and the lower end intimately engaged with the hollow of the boss portion 14a of the piston 14. Thus, the shaft 10 has a lower flexural rigidity against a thrust applied thereto in the direction perpendicular to the axis of the connecting pin 12. In other words, when a certain thrust is applied thereto from the trunnion 4, resilient flex of the shaft 10 takes place easily.

As is best shown in FIG. 1, a lower end of the hollow boss portion 14a of the piston 14 is projected from a bore of the cylinder body 15. The projected lower end of the portion 14a has an aluminum collar 35 disposed thereon. An upper half of the collar 35 is received in the bore of the cylinder body 15, as shown. Due to provision of the aluminum collar 35, an inner wall of the cylinder body 15 made of aluminum is protected from contacting the hollow boss portion 14a of the piston 14 made of iron.

It is to be noted that the above-mentioned articulated structure is also applied to the other trunnion 4 installed in the front transmission unit. For the same purpose, the shaft 10 extending from the other trunnion 4 has also a thinner middle portion corresponding to the above-mentioned thinner middle portion 10a.

It is further to be noted that, as is seen in FIG. 4, the articulated structure is also applied to both the trunnions 5 and 5 installed in the rear transmission unit. Respective shafts 10 extending from these trunnions 5 and 5 have each a thinner middle portion for the same purpose.

As is shown in FIG. 4, the control valve body 18 installs therein a speed control valve 17. That is, upon receiving a gear ratio command, the speed control valve 17 moves the pistons 14 with a hydraulic pressure corresponding to the content of the command. With this, each piston 14 pivots through the corresponding shaft 10 the trunnion 4 (or 5) between the above-mentioned neutral position and a desired offset position. Upon this, each power roller 3 is pivoted about the pivot axis "O3" (see FIG. 9) while receiving a component force from the input and output cone discs, so that the rotation speed of the output cone disc is continuously varied. Thus, a continuously variable speed change is carried out.

During this speed change operation, the process cam 9 installed in the front transmission unit feeds back the movement of the corresponding trunnion 4 to the speed control valve 17. Thus, the trunnions 4 and 5 of the front and rear transmission units are forced to return toward their original positions, and when the existing gear ratio becomes in agreement with the target value of the command, the trunnions 4 and 5 are returned to the original positions bringing back the power rollers 3 to their neutral positions. With this, the gear ratio is kept at the target value.

As has been described hereinabove, in the toroidal type-CVT 100A of the invention, a so-called "articulated structure" is associated with each of the trunnions 4 and 5 in the above-mentioned manner, and the shaft 10 extending from each of the trunnions 4 and 5 has a thinner middle portion 10a which is constructed in the above-mentioned manner.

With these unique structures, the following advantages are obtained in the invention.

First, undesired resilient flex or bending of each trunnion 4 (or 5), which would occur when the corresponding power roller is applied with a marked outward thrust from the input and output cone discs, is suitably absorbed by the "articulated structure" in such a manner as has been described hereinabove.

Second, due to presence of the thinner middle portion 10a of the shaft 10, the flex absorption by the "articulated structure" is promoted. That is, the resilient flex or bending of the trunnion 4 (or 5) has no effect on the piston 14, so that the continuous speed changing operation of the transmission 100A is precisely and reliably carried out. In fact, the friction force inevitably produced between the hollow boss portion 14a of the piston 14 and the bore wall of the cylinder body 15 is reduced to a negligible degree.

Third, due to usage of the washer 31 which contacts the wire pulley 34 with a larger contacting surface, the wire pulley 34 can be tightly secured to the lower end of the trunnion 4 (or 5). This increases the durability of the wire pulley 34.

Referring to FIGS. 5 to 8 of the drawings, there is shown a toroidal type-CVT 100B which is a second embodiment of the present invention. Since this second embodiment 100B is similar to the above-mentioned first embodiment 100A, only parts and portions which are different from those of the first embodiment 100A will be described in the following.

In the second embodiment 100B, there is no member which corresponds to the washer 31 employed in the first embodiment 100A. That is, in the second embodiment 100B, an upper end of a hollow boss portion 14a of a piston 14 directly and slidably contacts a lower end surface of the trunnion 4 or 5.

Figure 5:
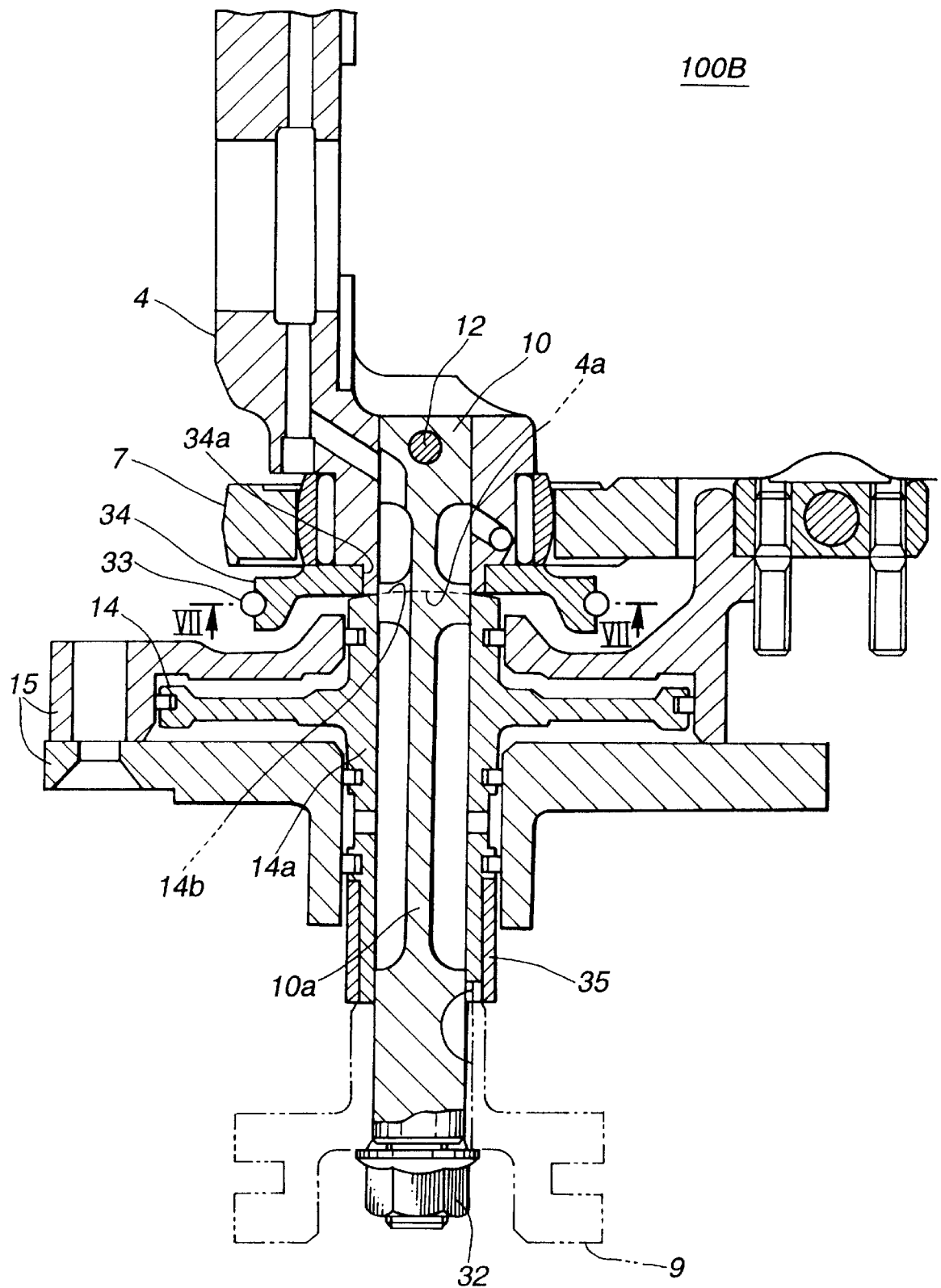
FIG. 5 is a view similar to FIG. 1, but showing a trunnion actuator part employed in a toroidal type-CVT of a second embodiment of the present invention.
Figure 8:
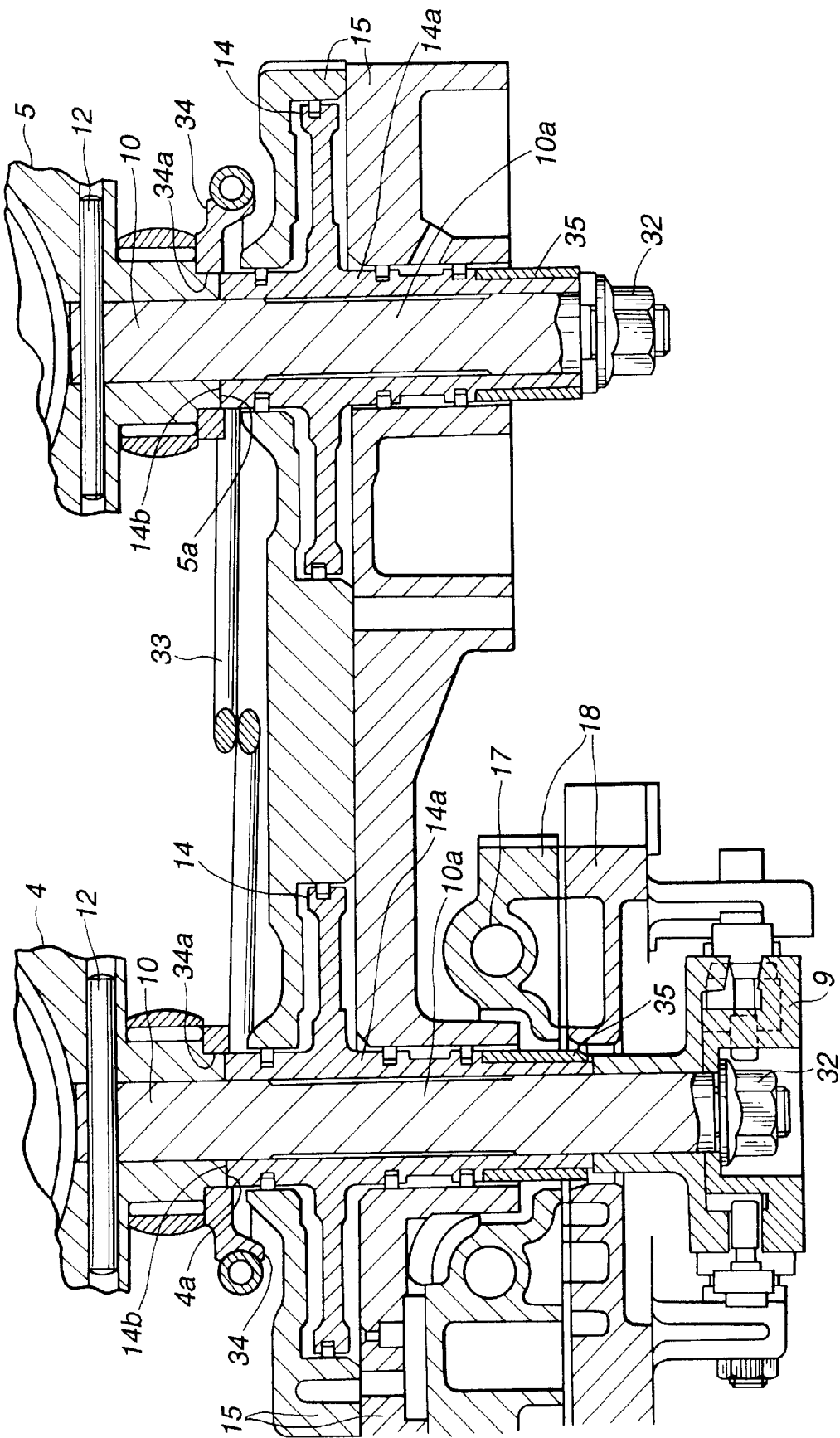
FIG. 8 is a sectional view of the trunnion actuator part of FIG. 5, but taken from a different direction.

As is seen from FIGS. 5 and 8, the lower end surface 4a or 5a of the trunnion 4 or 5 is shaped concave, and the upper end 14b of the hollow boss portion 14a is shaped convex. More specifically, the concave lower end surface 4a or 4b of the trunnion 4 or 5 and the convex upper end 14b of the hollow boss portion 14a are each shaped to constitute part of an imaginary cylindrical wall.

Figure 6:
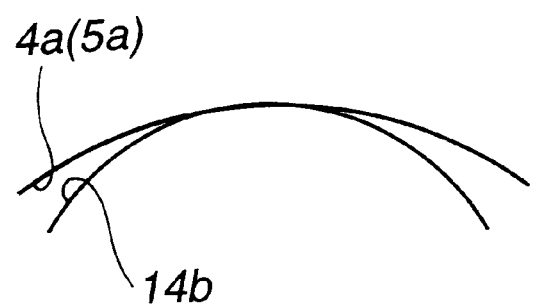
FIG. 6 is an illustration for explaining mutually contacting rounded surfaces respectively possessed by a trunnion and a piston which are employed in the toroidal type-CVT of the second embodiment.
Figure 7:
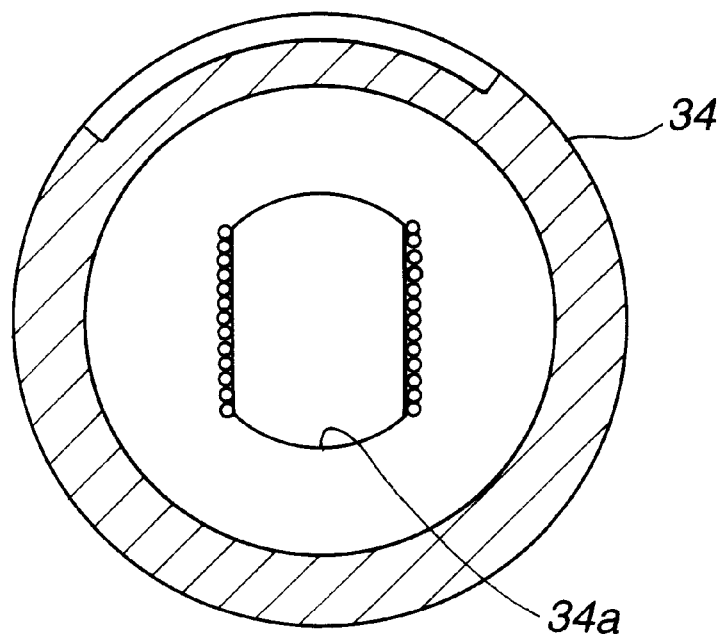
FIG. 7 is a sectional view of a wire pulley, which is taken along the line VII—VII of FIG. 5.

As is seen from FIG. 6, if desired, a radius of curvature of the convex upper end 14b may be smaller than that of the concave lower end surface 4a or 4b. In this case, undesired "gall" phenomenon between the two contacting portions 14b and 4a (or 4b) is assuredly eliminated.

In this second embodiment 100B, the above-mentioned first and second advantages possessed by the first embodiment 100A are obtained. Furthermore, in the second embodiment 100B, a simpler and lower cost production is achieved due to non-use of a washer.

What is claimed is:

1. A friction roller type continuously variable transmission comprising:

input and output discs, said input and output discs being arranged on a common axis;

friction rollers each operatively interposed between said input and output discs to transmit rotation therebetween;

supporting members each rotatably supporting the friction roller and having a shaft extending therefrom;

pistons each including a hollow boss portion that receives the shaft of the corresponding supporting member is received, said hollow boss portion having a first end engageable with a second end of the corresponding supporting member, so that when said piston is axially moved, the corresponding friction roller pivots to continuously change a speed ratio between the input and output discs;

links each connecting corresponding ends of said supporting members to suppress displacement of the friction roller, which displacement occurs when said input and output discs applies a thrust to the friction roller; and articulated structures respectively associated with the supporting members, each articulated structure being arranged between said first and second ends to positively induce the supporting member to pivot relative to the corresponding hollow boss portion when the friction roller is applied with the thrust.

2. A friction roller type continuously variable transmission as claimed in claim 1, in which said articulated structure comprises concave and convex surfaces which mutually contact in a manner to permit the pivotal movement of said supporting member relative to the corresponding hollow boss portion.

3. A friction roller type continuously variable transmission as claimed in claim 2, in which a radius of curvature of said convex surface is smaller than that of said concave surface.

4. A friction roller type continuously variable transmission as claimed in claim 1, further comprising a wire pulley which is tightly disposed on the supporting member at a position near said second end for achieving a synchronous operation between the corresponding friction roller and another friction roller.

5. A friction roller type continuously variable transmission as claimed in claim 4, in which said articulate structure comprises:

a washer interposed between said first and second ends and holding said wire pulley in position, wherein said washer has one of concave and convex surfaces and said first end has the other of said concave and convex surfaces, wherein said concave and convex surfaces mutually contact and positively induce said supporting member to pivot relative to the corresponding hollow boss portion.

6. A friction roller type continuously variable transmission as claimed in claim 1, in which said shaft has a thinner middle portion, which is received in said hollow boss portion, said thinner middle portion having less rigidity so that the middle portion bend when applied with a certain thrust.

7. A friction roller type continuously variable transmission as claimed in claim 1, in which each of said articulated structures is configured to substantially prevent the supporting member from pivoting perpendicularly to a direction of the thrust.

8. A friction roller type continuously variable transmission as claimed in claim 1, in which said first end is slidably engaged on a generally cylindrical sliding surface formed on said second end, said cylindrical sliding surface extending substantially perpendicularly to a direction of the thrust.

9. A toroidal type continuously variable transmission comprising:

input and output cone discs, said input and output cone discs being coaxially arranged;

power rollers each operatively interposed between said input and output cone discs;

trunnions respectively rotatably supporting said power rollers;

upper and lower links, said upper link having opposed ends to which upper ends of the trunnions are connected, and said lower link having opposed ends to which lower ends of the trunnions are connected;

shafts extending downward from said lower ends of the trunnions, each shaft being connected to the corresponding lower end through a connecting pin;

pistons respectively associated with the shafts, each piston including a hollow boss portion, which receives therein the corresponding shaft, said hollow boss portion having an upper end facing toward said lower end of the corresponding trunnion; and articulated structures respectively associated with the trunnions, each articulated structure being arranged between the upper end of said hollow boss portion and the lower end of the corresponding trunnion, so that when a thrust force is applied to the trunnion in a direction to resiliently bend the same, the trunnion is positively induced to pivot relative to said hollow boss position in a direction to absorb the bending of the trunnion.

10. A toroidal type continuously variable transmission as claimed in claim 7, in which each articulated structure comprises mutually contacting concave and convex surfaces.

11. A toroidal type continuously variable transmission as claimed in claim 10, in which each of said concave and convex surfaces constitutes part of an imaginary cylindrical wall whose center axis extends in parallel with an axis of said connecting pin.

12. A toroidal type continuously variable transmission as claimed in claim 11, in which a radius of curvature of the convex surface is smaller than that of the concave surface.

13. A toroidal type continuously variable transmission as claimed in claim 11, in which:

said concave surface is defined by one of the lower end of the corresponding trunnion and the upper end of said hollow boss portion, and said convex surface is defined by the other of the lower end of the corresponding trunnion and the upper end of said hollow boss portion.

14. A toroidal type continuously variable transmission as claimed in claim 11, in which:

said concave surface is defined by a lower surface of a washer which is interposed between the upper end of said hollow boss portion and the lower end of the corresponding trunnion; and said convex surface is defined by the upper end of said hollow boss portion.

15. A toroidal type continuously variable transmission as claimed in claim 11, in which:

said convex surface is defined by a lower surface of a washer which is interposed between the upper end of said hollow boss portion and the lower end of the corresponding trunnion; and said concave surface is defined by the upper end of said hollow boss portion.

16. A toroidal type continuously variable transmission as claimed in claim 11, in which each of said shafts has a thinner middle portion which is placed in the corresponding hollow boss portion, said thinner middle portion being so constructed and oriented as to be resiliently flexed when applied with a certain thrust.

* * * * *